United States Patent [19]

Bishop et al.

[11] Patent Number: 4,522,465

[45] Date of Patent: Jun. 11, 1985

[54] OPTICAL FIBER COATED WITH AN ULTRAVIOLET CURED TOPCOATING

[75] Inventors: Timothy E. Bishop, Arlington Heights; George Pasternack, Lincolnshire, both of Ill.

[73] Assignee: DeSoto, Inc., Des Plaines, Ill.

[21] Appl. No.: 550,443

[22] Filed: Nov. 10, 1983

[51] Int. Cl.[3] .............................. G02B 5/16
[52] U.S. Cl. ..................... 350/96.30; 204/159.19; 350/96.23; 427/54.1; 427/165; 427/331; 427/407.2; 427/407.3; 428/375; 428/392; 525/920
[58] Field of Search .............. 428/375, 392, 378; 427/54.1, 165, 168, 169, 331, 407.2, 407.3; 350/96.23, 96.30, 96.33, 96.34, 96.29; 525/438, 440, 455, 920; 528/75; 204/159.19, 159.23

[56] References Cited

U.S. PATENT DOCUMENTS

| | | | |
|---|---|---|---|
| 4,264,752 | 4/1981 | Watson, Jr. | 528/75 X |
| 4,319,811 | 3/1982 | Tu et al. | 204/159.23 X |
| 4,348,427 | 9/1982 | Priola et al. | 525/920 X |
| 4,472,019 | 9/1984 | Bishop et al. | 350/96.23 X |
| 4,472,021 | 9/1984 | Ansel et al. | 350/96.3 X |

*Primary Examiner*—Lorraine T. Kendell
*Attorney, Agent, or Firm*—Dressler, Goldsmith, Shore, Sutker & Milnamow

[57] ABSTRACT

Buffer-coated and overcoated optical glass fiber is disclosed in which the topcoat has the high strength and high tensile modulus combined with good elongation and solvent resistance associated with extruded jacket coatings, but which is applied by ordinary coating procedures and cured by exposure to ultraviolet radiation. The coating compositions which enable this to be achieved comprise 30% to about 80% of linear diethylenic polyester polyurethanes which are the linear polyurethane reaction product of an organic diisocyanate with hydroxy-functional polyester formed by reacting a diol, such as ethylene glycol, with certain dicarboxylic acids, such as adipic acid. This polyurethane is end capped with a monoethylenically unsaturated monohydric alcohol. At least 50% of this diethylenic polyester polyurethane is combined with at least 5% of liquid diethylenic diester of a diglycidyl ether of a bisphenol, and at least 5% of liquid monoethylenically unsaturated monomer having a glass transition temperature above about 55° C., these proportions being based on total reactive components.

12 Claims, No Drawings

OPTICAL FIBER COATED WITH AN ULTRAVIOLET CURED TOPCOATING

DESCRIPTION

1. Technical Field

This invention relates to ultraviolet curable coating compositions which are adapted to be employed as an overcoating on buffer coated optical glass fiber in order to provide superior physical properties, and it includes the production of such overcoated fiber and the overcoated fiber itself.

2. Background Art

Optical glass fiber is presently protected by applying to the freshly formed glass fiber a buffer coating of a resin which possesses an appropriate refractive index and a low tensile modulus which remains low at very low temperature (−60° C.) to minimize the danger of microbending when such low temperatures are encountered. For rapid application and cure, coatings which cure on exposure to ultraviolet radiation are needed. Unfortunately, these buffer coatings are not very resistant to organic solvents, they lack abrasion resistance, and have inadequate resistance to applied stress.

To improve the properties of the coated optical fibers, it has been found to be desirable to topcoat the buffer coated optical glass fiber with a tough and flexible overcoat which possesses superior resistance to solvents and abrasion, and better resistance to applied stress. In order to obtain the desired properties in optical glass fibers which have been buffer coated and then topcoated, resort has been had to the use of extruded Nylon "jacket" coatings, but these are more expensive and more difficult to apply than an ultraviolet-cured coating.

It is also known to apply both coatings at high speed using an ultraviolet-curable topcoat on top of a buffer coating which has been ultraviolet cured, but the topcoats have not possessed the needed resistance to solvents and enough rupture strength without also being too rigid (having too little flexibility). As a matter of interest, by applying both coatings sequentially to freshly drawn optical glass fiber, one avoids the possibility of damaging the buffer coated fiber and achieves a considerable economy.

This invention is concerned with providing ultraviolet-cured topcoatings which will duplicate, or substantially duplicate, the properties which are now obtained using the extruded "jacket" coatings noted above so that high speed coating procedures can be used to economically produce buffer coated and topcoated optical glass fiber which will satisfy the demanding commercial requirements which are sometimes insisted upon. The combination of moderate elongation with exceptionally high tensile modulus is particularly contemplated.

DISCLOSURE OF INVENTION

In accordance with this invention, at least 50%, preferably at least 60%, of certain linear diethylenically unsaturated polyester polyurethanes are combined with at least 5%, preferably at least 8%, of certain diesters of monoethylenic acids with diepoxides, and at least 5%, preferably at least 15%, of at least one monoethylenically unsaturated monomer having a glass transition temperature in excess of about 55° C. While upper limits for these proportions are not essential, they are discussed elsewhere. This combination of reactive components is provided in a radiation-curable, preferably an ultraviolet-curable, coating composition which provides a tensile modulus in excess of 150,000 psi., preferably in excess of 175,000 psi., in combination with an elongation of at least about 15%. These properties are measured by depositing a 3 mil test film and curing it by ultraviolet exposure to provide a free film whose properties can be measured. Prior radiation-cured coatings having this considerable strength lacked desired flexibility, evidenced by an elongation of less than 10%.

More particularly, in this invention buffer-coated optical glass fiber is overcoated with a topcoat having the exceptional tensile modulus and moderate elongation properties which have been discussed, as is now associated with extruded jacket coatings, but which is applied by ordinary coating procedures and cured by radiation exposure, preferably with ultraviolet radiation. This is done by applying to buffer-coated optical glass fiber the radiation-curable coating composition described previously, and then exposing the coated fiber to ultraviolet or other radiation to cure the same.

To provide coating compositions capable of forming films of the desired character, we have found that one must rely upon certain linear diethylenic, preferably diacrylate-functional, polyurethanes which are more particularly defined hereinafter. These are based on a polyester which is the polyesterification reaction product of a dicarboxylic acid having from 4 to 10 carbon atoms, such as adipic acid, succinic acid, or the like, with about two molar proportions of a diol having from 2 to 4 carbon atoms, such as ethylene glycol. The resulting hydroxy-functional low molecular weight polyester is reacted with an organic diisocyanate, and the resulting urethane oligomer is end capped with monoethylenic groups, preferably acrylate groups. This can be done by providing an hydroxy-functional oligomer which is reacted with excess diisocyante and then with a monoethylenic monomer having a single isocyanate-reactive hydrogen atom, such as 2-hydroxyethyl acrylate, 2-hydroxypropyl methacrylate, or the like. The same result can be achieved by using a deficiency of diisocyanate in the initial reaction with the hydroxy-functional polyester to form an hydroxy-functional oligomer which is then reacted with a monoethylenic-functional monoisocyanate provided, for example, by reacting an acrylate having a single hydroxy group with one molar proportion of diisocyanate. In this procedure it is preferred to use a diisocyanate, like isophorone diisocyanate or 2,4-toluene diisocyanate, which have one isocyanate group far more reactive than the other.

These two different procedures for forming ethylenic-terminated polyurethanes are each known, so process considerations are of secondary interest herein. Using the preferred process in which excess diisocyanate is employed, the diethylenic polyurethane products can be described by the following structural formula:

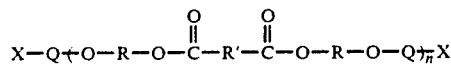

in which X is the residue of a monoethylenically unsaturated monohydric alcohol, preferably an hydroxy acrylate like 2-hydroxyethyl acrylate, 2-hydroxybutyl acrylate and the hydroxy-functional acrylate derived from caprolactone and supplied by Union Carbide Corporation under the designation Tone M-100, Q is the residue of an organic diisocyanate such as isophorone diisocyanate, R is an alkylene group containing from 2-4 carbon atoms, preferably ethylene, R' is an alkylene group containing from 2-8 carbon atoms, preferably butylene or isobutylene, and n is a number from about 1.8 to about 4, preferably 2.0.

To embrace the process variation which has been noted, one can also use products having the following formula:

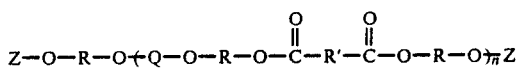

in which the symbols used have the meanings assigned, and Z is a monoisocyanate-functional monoethylenically unsaturated compound used as a capping agent, such as the reaction product of one mole of 2-hydroxyethyl acrylate with one mole of isophorone diisocyanate, or isocyanatoethyl methacrylate.

The diethylenic-functional polyurethanes which have been described are combined with liquid components to provide the coating viscosity which is desired and also to provide the strength and tensile modulus needed in the cured coatings. While other diethylenic-functional polyurethanes have been used, it has not previously been possible to provide the specified combination of characteristics.

The first component which is added to the diethylenic-functional polyurethanes is a diethylenic diester of a diglycidyl ether of a bisphenol, typically bisphenol A. The diglycidyl ether need merely be of sufficiently low molecular weight as to provide a diester which is liquid, molecular weights below about 600 being suitable, and a molecular weight of about 350-400 being preferred. These products are preferably acrylate-functional and are easily made by esterifying an appropriate diglycidyl ether with acrylic acid. The term diglycidyl ether here denotes a product having at least 1.8 oxirane groups per molecule with substantially all of these oxirane groups being consumed in the production of the desired acrylate diester. The maximum proportion of this component is limited only by the required presence of a minimum amount of the other components.

Another of the components which is added is at least one high glass transition temperature monoethylenically unsaturated monomer, preferably an acrylate, and while these have been used in compositions not herein contemplated, the combination of high strength and flexibility achieved herein has not previously been provided.

Many monoethylenically unsaturated monomers of high glass transition temperature are known for inclusion in radiation-curable coating compositions, and several of these are illustrated in the examples herein. At least about 5% of the reactive components in the composition, and preferably at least 15%, are monomers having a glass transition temperature above about 55° C. These are illustrated by dimethyl acrylamide, N-vinyl pyrrolidone, isobornyl acrylate, acrylic acid and dicyclopentenyl acrylate. They all render the composition more fluid, which aids rapid application. It is preferred not to use more than 45% of these monomers to avoid excessive fluidity.

Also, it is permissible to include minor amounts, up to about 15%, of low molecular weight polyacrylates, such as trimethylol propane triacrylate, or pentaerythritol triacrylate, for these also reduce the viscosity and increase strength without unduly sacrificing the needed elongatability.

In the coating compositions which are employed, the diacrylate-functional polyurethanes should constitute at least about 50% of the reactive components in the coating, preferably at least about 60%, but this component will not exceed about 80% of the coating composition, and will preferably not exceed about 75%.

Minor proportions of volatile nonreactive solvents, such as acetone or ethyl alcohol, may also be present to adjust viscosity, but this is not preferred because the rapid action needed on the fiber-forming equipment makes it difficult to volatilize away any large amount of solvent prior to ultraviolet exposure.

The buffer coatings which may be used will vary considerably, but these are characterized by a relatively low tensile modulus at room temperature. It is because the buffer coating on the optical glass fiber has a room temperature modulus below 10,000 psi, preferably below 2,000 psi, that overcoating becomes important. Very low modulus ultraviolet-cured coatings which are usually overcoated are described in the application of R. Ansel Ser. No. 170,148 filed July 18, 1980. These can be described as ethylenic-terminated polyurethane, polyamide or polyurea oligomers having a molecular weight in the range of about 2000 to about 8000 and containing one amide, urea or urethane group for every 300 to 900 units of molecular weight, and containing polyalkylene polyether, polyalkylene polythiol or polyalkylene polyester in which the alkylene moiety contains 2 to 6 carbon atoms. These diacrylate oligomers are combined with 20% to 50% of the composition of a radiation-curable monoethylenic monomer having a $T_g$ below about $-10°$ C., such as phenoxyethyl acrylate, and with 2% to 20% of a monoethylenic monomer having a strong capacity for hydrogen bonding, such as N-vinyl pyrrolidone.

To more particularly characterize the polyesters which are employed herein, these are made by polyesterifying a dicarboxylic acid with a diol. While dicarboxylic acids are referred to, it will be appreciated that these may be used in the form of an anhydride, like adipic anhydride, but this is not necessary. Adipic acid is preferred, but one may also use succinic acid, glutaric acid, pimelic acid, suberic acid, azelaic acid, and sebacic acid. Ethylene glycol is preferred, but one may also use propylene glycol or butylene glycol.

Any organic diisocyanate may be used, isophorone diisocyanate or 2,4-toluene diisocyanate being preferred. This component is well known in the art of providing linear polyurethanes, and any of these diisocyanates may be used.

The end capping of the isocyanate-terminated polyurethane can be achieved using many other monohydric capping agents. Thus, while 2-hydroxyethyl acrylate was mentioned previously, and is preferred, one can also use the several hydroxy-functional monoethylenic esters noted previously. To illustrate less preferred agents, one may use 2-hydroxypropyl methacrylate, 2-hydroxyethyl itaconate, and allyl alcohol.

The radiation which will effect cure will vary with the presence or absence of a photoinitiator and its selection. In the absence of a photoinitiator, electron beam radiation can be used for cure, but this is not preferred. The usual photoinitiators enabling ultraviolet cure, especially in acrylate-functional systems, are ketonic, such as about 3% of diethoxy acetophenone. Other photoinitiators are illustrated by benzil dimethyl ketal, acetophenone, benzophenone, m-chloro acetophenone, propiophenone, thioxanthone, benzoin, benzil, anthraquinone, and the like. These may be used singly, or in mixtures, in an amount up to about 10% of the coating (usually 1-5%). Various amines may also be added to enhance the cure, such as diethyl amine, but this is not essential.

Even visible light not too remote from the ultraviolet range may be employed using appropriate photoinitiators. These are illustrated by camphor quinone and coumarin which are used together with a tertiary amine, such as triethyl amine. Diphenylbenzoylphosphine is also useful in and near the ultraviolet range.

Throughout this application, including the examples and claims which follow, all parts and proportions are by weight, unless otherwise stated.

The invention will be illustrated in the Examples which follow:

EXAMPLE 1

One mole of adipic acid is esterified with two moles of ethylene glycol to provide a product largely constituted by adipic acid diester in the substantial absence of polymers of higher molecular weight.

EXAMPLE 2

2 molar proportion of the adipic acid diester of Example 1 is reacted with 3 molar proportions of isophorone diisocyanate in the presence of a trace of dibutyl tin dilaurate to provide a linear isocyanate-terminated polyurethane, and 2 molar proportions of 2-hydroxyethyl acrylate are then added and reacted in to end cap the diisocyanate-functional polymer and provide a diacrylate polyurethane.

EXAMPLE 3

65 parts of the diacrylate polyurethane of Example 2 are mixed with 20 parts of N,N-dimethylacrylamide, 12 parts of the diacrylate of a diglycidyl ether of bisphenol A having an average molecular weight prior to acrylation of about 370 and a 1,2-oxirane equivalency of about 2.0, and 3 parts of a photoinitiator (see note 1) to provide an ultraviolet curable coating composition having a room temperature viscosity of 7550 centipoises. On ultraviolet cure of a film cast on glass and removal to provide a film having a thickness of 3 mil, the cured film was found to have excellent properties closely resembling that of a Nylon film of the same thickness. These properties will be tabulated hereinafter.

Note 1: benzil dimethyl ketal (Irgacure 651 supplied by Ciba-Geigy may be used)

EXAMPLE 4

Example 3 was repeated to see if the results could be reproduced, and these results are also reported hereinafter.

The coating performance obtained in Example 3 is here compared with the same performance parameters for the best epoxy urethane acrylate radiation curable coating composition now used for optical fiber topcoating (identified as "prior" in the Table), and also with the performance provided by Nylon 11.

TABLE

| Property | Ex. 3 | Ex. 4 | prior | Nylon* |
|---|---|---|---|---|
| Tensile (psi.) | 6576 | 5607 | 3500 | 7100 |
| Elongation (percent) | 23 | 15 | 12 | 300 |
| Modulus (psi.) | 206,600 | 157,333 | 100,000 | 143,000 |
| Rupture (in-lb./in³) | 2147 | 1288 | 800 | |
| Xylene absorption (percent) | 3.7 | — | 6.0 | 2.2 |

*indicates reported values

As will be evident, the compositions of this invention are uniquely suited to the overcoating of buffer-coated optical glass fiber because they are far stronger than the best polyurethane acrylate previously available, but at the same time they are considerably more flexible. Thus, they more closely approximate the extruded nylon jacket coatings, albeit they are much easier to apply. Also, and while some flexibility is sacrificed, the topcoats of this invention have a tensile modulus which is even higher than is normally obtained using an extruded Nylon 11 jacket coating.

What is claimed is:

1. A resin buffer-coated and topcoated optical glass fiber in which the topcoat is an ultraviolet cured coating of an ultraviolet curable coating composition which, when formed into a 3 mil cured test film, has a tensile modulus measured at room temperature of at least 150,000 psi. and an elongation at least about 15%, said composition comprising, based on total reactive components, from 30% up to about 80% of diethylenic polyester polyurethane having one of the following formulas:

in which X is the residue of a monoethylenically unsaturated monohydric alcohol, Q is the residue of an organic diisocyanate, R is an alkylene group containing from 2-4 carbon atoms, R' is an alkylene group containing from 2-8 carbon atoms, and n is a number from about 1.8 to about 4; and

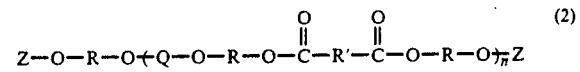

in which the symbols have the above assigned meanings and Z is a monoisocyanate-functional monoethylenically unsaturated compound; at least 5% of total reactive components of liquid diethylenically unsaturated ester of a diglycidyl ether of a bisphenol, and at least 5% of total reactive components of liquid monoethylenically unsaturated monomer having a glass transition temperature above about 55° C.

2. A coated optical fiber as recited in claim 1 in which X is the residue of 2-hydroxyethyl acrylate.

3. A coated optical fiber as recited in claim 2 in which R is the ethylene radical, R' is an alkylene group containing 6 carbon atoms, and n is about 2.0.

4. A coated optical fiber as recited in claim 1 in which said monoethylenically unsaturated monomer is selected from the group consisting of dimethyl acrylamide, N-vinyl pyrrolidone, isobornyl acrylate, acrylic acid and dicyclopentenyl acrylate.

5. A coated optical fiber as recited in claim 4 in which said monomer is present in an amount not in excess of 45%.

6. A coated optical fiber as recited in claim 1 in which said diisocyanate is the residue of isophorone diisocyanate or 2,4-toluene diisocyanate.

7. A coated optical fiber as recited in claim 1 in which said buffer coating on said optical glass fiber has a room temperature tensile modulus below 10,000 psi.

8. A coated optical fiber as recited in claim 7 in which said buffer coating on said optical glass fiber has a room temperature tensile modulus below 2,000 psi.

9. A resin buffer-coated and topcoated optical glass fiber in which the buffer coating has a room temperature tensile modulus of less than 10,000 psi, and the topcoat is an ultraviolet cured coating which, in a 3 mil test film, has a tensile modulus measured at room temperature of at least 175,000 psi. and an elongation of at least 15%, said topcoat comprising from 40% up to about 70% of total reactive components of diacrylate polyester polyurethane having the formula:

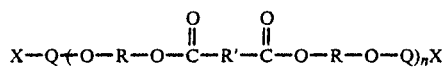

in which X is the residue of a monohydric monoacrylate, Q is the residue of an organic diisocyanate, R is an alkylene group containing from 2-4 carbon atoms, R' is an alkylene group containing from 2-8 carbon atoms, and n about 2, at least 8% of total reactive components of liquid diacrylate of a diglycidyl ether of bisphenol A having a molecular weight of 350-400, and at least 15% of total reactive components of monoethylenically unsaturated monomer selected from the group consisting of dimethyl acrylamide, N-vinyl pyrrolidone, isobornyl acrylate, acrylic acid and dicyclopentenyl acrylate.

10. A method of topcoating resin buffer-coated optical glass fiber to provide a topcoat having the high strength and modulus combined with good elongation and solvent resistance associated with extruded jacket coatings, but which is applied by ordinary coating procedures and cured by exposure to ultraviolet radiation comprising, applying to resin buffer-coated optical glass fiber an ultraviolet-curable coating composition comprising, based on total reactive components, from 30% up to about 80% of diethylenic polyester polyurethane having one of the following formulas:

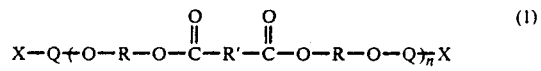

in which X is the residue of a monoethylenically unsaturated monohydric alcohol, Q is the residue of an organic diisocyanate, R is an alkylene group containing from 2-4 carbon atoms, R' is an alkylene group containing from 2-8 carbon atoms, and n is a number from about 1.8 to about 4; and

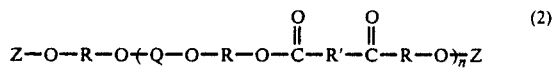

in which the symbols have the above assigned meaning and Z is a monoisocyanate-functional monoethylenically unsaturated compound; at least 5% of total reactive components of liquid diethylenically unsaturated ester of a diglycidyl ether of a bisphenol, and at least 5% of total reactive components of liquid monoethylenically unsaturated monomer having a glass transition temperature above about 55° C., and then exposing the wet-coated fiber to ultraviolet light to cure the coating.

11. A method as recited in claim 10 in which said buffer coating on said optical glass fiber has a room temperature tensile modulus below 10,000 psi.

12. A method as recited in claim 11 in which said coating composition contains up to 45% of said monoethylenically unsaturated monomer having a glass transition temperature above about 55° C.

* * * * *